United States Patent
Terashima et al.

(10) Patent No.: US 10,236,747 B2
(45) Date of Patent: Mar. 19, 2019

(54) STRAIN WAVE GEARING WITH BUILT-IN MOTOR

(71) Applicant: Harmonic Drive Systems Inc., Shinagawa-ku, Tokyo (JP)

(72) Inventors: Tomoki Terashima, Azumino (JP); Kiyoto Kobayashi, Azumino (JP); Sachio Oshima, Komagane (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 184 days.

(21) Appl. No.: 15/484,357

(22) Filed: Apr. 11, 2017

(65) Prior Publication Data
US 2017/0338718 A1    Nov. 23, 2017

(30) Foreign Application Priority Data
May 17, 2016    (JP) .................. 2016-098962

(51) Int. Cl.
| F16H 49/00 | (2006.01) |
| H02K 7/116 | (2006.01) |
| F16H 57/04 | (2010.01) |
| H02K 9/00 | (2006.01) |
| H02K 5/20 | (2006.01) |
| H02K 9/22 | (2006.01) |
| H02K 5/08 | (2006.01) |

(Continued)

(52) U.S. Cl.
CPC ........... *H02K 7/116* (2013.01); *F16H 49/001* (2013.01); *F16H 57/0476* (2013.01); *H02K 5/20* (2013.01); *H02K 9/00* (2013.01); *H02K 9/22* (2013.01); *F16H 57/0415* (2013.01); *F16H 57/0417* (2013.01); *F16H 57/0419* (2013.01); *H02K 5/08* (2013.01); *H02K 9/10* (2013.01); *H02K 9/19* (2013.01)

(58) Field of Classification Search
CPC . H02K 7/116; H02K 9/00; H02K 5/20; H02K 9/22; H02K 5/08; H02K 9/10; H02K 9/19; B25J 9/1025; F16H 49/001; F16H 57/0476; F16H 57/0415; F16H 57/0417; F16H 57/0419
USPC .................. 74/640; 310/80, 83; 475/149
See application file for complete search history.

(56) References Cited

U.S. PATENT DOCUMENTS

| 8,757,029 B2* | 6/2014 | Negishi | B25J 9/1025 74/411 |
| 9,394,984 B2* | 7/2016 | Balsiger | F16H 49/001 |
| 2016/0010738 A1* | 1/2016 | Balsiger | F16H 49/001 74/640 |

FOREIGN PATENT DOCUMENTS

| JP | 5197174 B | 5/2013 |
| JP | 2015-140910 A | 8/2015 |

* cited by examiner

*Primary Examiner* — Burton S Mullins
(74) *Attorney, Agent, or Firm* — Buchanan Ingersoll & Rooney PC (57) ABSTRACT

A strain wave gearing with a built-in motor is provided with a motor, a wave gear mechanism enclosing the motor coaxially, and a heat-insulation spacing formed therebetween. The wave gear mechanism has a wave generator attached to the motor rotor so as to rotate integrally with the motor rotor. A wave generator plug of the wave generator is fixed to a rotor magnet back yoke of the motor rotor so as to enclose the rotor magnet back yoke. The spacing is formed in a contact surface portion between the rotor magnet back yoke and the wave generator back yoke, whereby heat transfer from the motor to the wave gear mechanism is suppressed.

8 Claims, 5 Drawing Sheets

(51) Int. Cl.
*H02K 9/10* (2006.01)
*H02K 9/19* (2006.01)

STRAIN WAVE GEARING WITH BUILT-IN MOTOR

BACKGROUND OF THE INVENTION

Field of the Invention

The present invention relates to a strain wave gearing with a built-in motor, the strain wave gearing being provided with an outer rotor type motor.

Description of the Related Art

The inventions disclosed in Patent Documents 1 and 2 are examples of strain wave gearings with a built-in motor. In the drive unit disclosed in Patent Document 1, three rigid internally toothed gears are disposed along an axial direction, and a cylindrical flexible externally toothed gear is disposed on the inner sides of these internally toothed gears. The externally toothed gear is made to flex into an ellipsoidal shape by a wave generator disposed on the inner side thereof, and meshes with each of the internally toothed gears. The wave generator, which is fixed to a rotor of a motor incorporated on the inner side of the wave generator, rotates integrally with the rotor.

In a motor with a strain wave reduction gearing disclosed in Patent Document 2, the motor is built into a cup-type strain wave reduction gearing, and a wave generator of the strain wave reduction gearing, which is disposed so as to enclose a rotor of the motor, is fixed to the rotor so as to rotate integrally.

Patent Document 1: JP 2015-140910 A
Patent Document 2: JP 5197174 B

In a strain wave gearing with a built-in motor, the wave generator is directly fixed to the motor rotor. There is no need for a transmission member for transmitting rotation outputted by the motor to the wave generator, which is an element that inputs the rotation of the wave gear drive, and such a configuration is beneficial for making the device smaller and more compact.

However, the motor, which is a source of heat generation, is disposed inside the strain wave reduction gearing, and the wave generator of the strain wave reduction gearing is fixed to the motor rotor so as to cover the external peripheral surface of the motor rotor. Because of this, motor heat generated in the motor spreads to the strain wave reduction gearing enclosing the outer side of the motor, and there is a possibility of adverse effects such as overheating of the strain wave reduction gearing, and scorching of the sliding portion, the teeth meshing portion, etc. Additionally, there is a risk that motor heat will be confined inside the motor without being discharged to the exterior, and the motor and the portion of the strain wave reduction gearing that is in contact with the motor will become overheated.

SUMMARY OF THE INVENTION

A main object of the present invention is to provide a strain wave gearing with a built-in motor, with which it is possible to prevent overheating of structural components of a strain wave gearing due to heat generated by the built-in motor.

Another object of the present invention is to provide a strain wave gearing with a built-in motor, in which heat can be efficiently discharged to the exterior.

To overcome the problems described above, a strain wave gearing with a built-in motor of the present invention is characterized by comprising:

a wave gear mechanism;
a motor coaxially incorporated in a center portion of the wave gear mechanism; and
a heat-insulating spacing disposed between the wave gear mechanism and the motor;
the motor being provided with a motor stator and a motor rotor disposed so as to enclose the motor stator;
the wave gear mechanism being provided with a wave generator attached to the motor rotor so as to rotate integrally with the motor rotor;
the wave generator being disposed so as to enclose the motor rotor; and
the spacing being formed between the motor rotor and the wave generator.

In the strain wave gearing with a built-in motor of the present invention, the spacing is formed between the motor rotor of the built-in motor and the wave generator of the wave gear mechanism attached to the rotor. The area of heat transferred from the motor to the wave generator can be reduced by the spacing, and heat transfer from the motor to the side having the wave gear mechanism can be minimized. It is thereby possible to prevent overheating of the sliding portion and the teeth-meshing portion of the wave gear mechanism.

There are cases in which the motor rotor is provided with a cylindrical motor rotor back yoke to which a rotor magnet is attached, and the wave generator is provided with a cylindrical wave generator plug having an internal peripheral surface which is in surface contact with the external peripheral surface of the motor rotor back yoke, and a wave generator bearing fitted over a non-circular external peripheral surface of the wave generator plug. In this case, the spacing may be formed between the external peripheral surface of the wave generator plug and the internal peripheral surface of the motor rotor back yoke.

The spacing can be either a spacing that is continuous in the axial direction or the circumferential direction, or a spacing that is formed to be non-continuous in the axial direction or the circumferential direction. Appropriately forming the spacing makes it possible to attain the needed effect of minimizing heat transfer while maintaining the appropriate levels of joining strength between the motor rotor back yoke and the wave generator plug, and the respective strengths of these members.

In order for heat generated inside the motor to be efficiently discharged to the exterior, a motor bracket to which the motor stator is attached is preferably utilized to increase heat dissipation. In the present invention, a hollow part is formed in the motor stator of the motor, a shaft portion is formed in the motor bracket, and this shaft portion is inserted through the hollow part of the motor stator.

The heat generated inside the motor spreads from the motor stator to the shaft portion of the bracket on the inner side of the stator and through inside of the bracket, and the heat is released to the exterior from a bracket end plate portion that is exposed to the exterior in the bracket. Overheating of the motor interior can thereby be prevented.

In order for the heat generated inside the motor to be actively released (discharged) to the exterior, it is preferable for a cooling medium circuit to be formed in the shaft portion of the bracket. The strain wave gearing with a built-in motor can be subjected to forced air-cooling or water-cooling by circulating air, water, or another cooling medium through the cooling medium circuit.

Additionally, at least the stator coil of the motor stator is preferably molded from a high-thermal-conductivity resin. Due to a molded coil being used, miniscule gaps in between the coil windings are filled by the resin, the thermal conductivity of the stator coil is higher, and the heat dissipation thereof is improved.

In the present invention, because an outer rotor type motor is used, the center part of the device is a fixed part. The fixed part can be a hollow part, and an encoder can be incorporated into this hollow part. Specifically, the shaft portion of the motor bracket can be a hollow shaft portion, and an encoder can be incorporated into the hollow part of this hollow shaft portion. If so, the encoder can be installed without increasing the overall length of the device.

Various structures can be used for the wave gear mechanism. For example, a flat strain wave gearing in which a cylindrical and flexible externally toothed gear is disposed on the inner sides of two rigid internally toothed gears, a silk-hat-profile strain wave gearing provided with a flexible externally toothed gear in the shape of a silk hat, or a cup-profile strain wave gearing provided with a flexible externally toothed gear in the shape of a cup can be used.

MODE FOR CARRYING OUT THE INVENTION

Embodiments of a strain wave gearing with a built-in motor to which the present invention is applied are described below with reference to the drawings.

Embodiment 1

Figure 1:
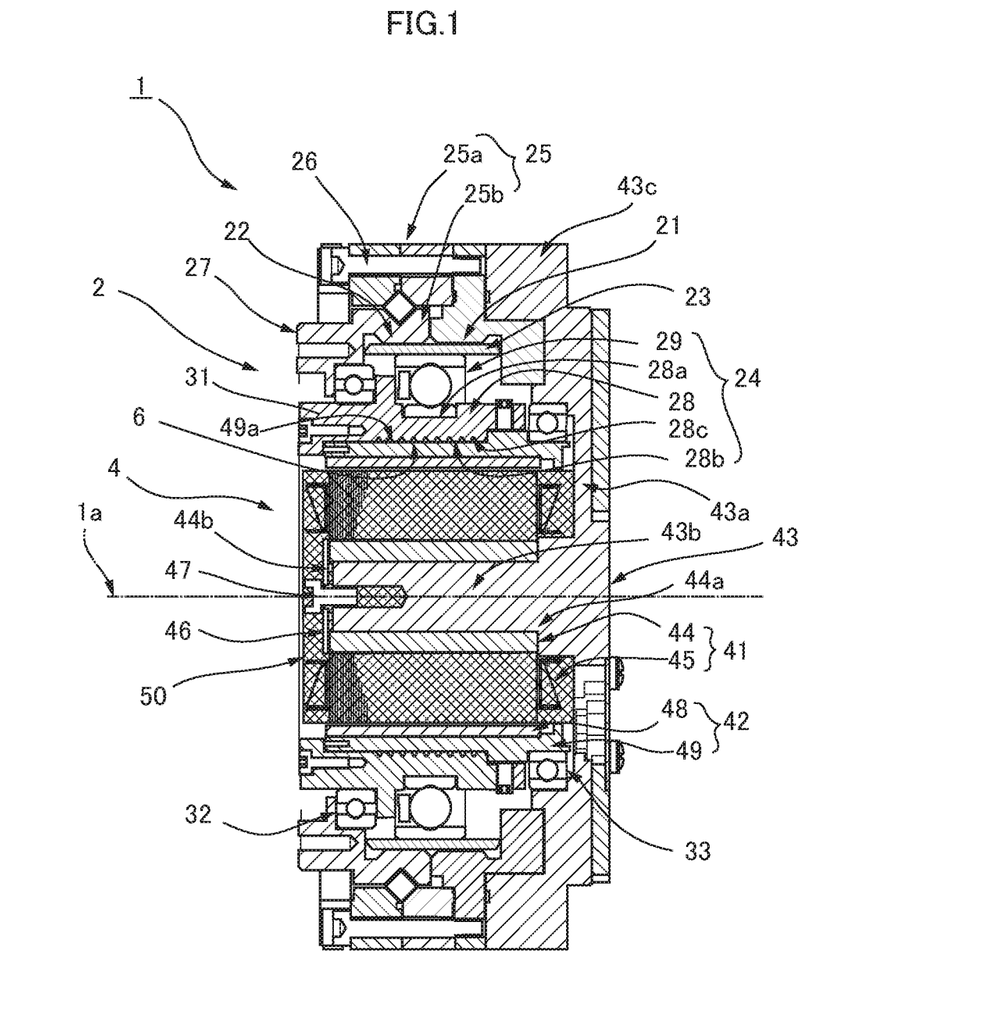
FIG. 1 is a schematic longitudinal cross-sectional view showing a strain wave gearing with a built-in motor according to Embodiment 1 of the present invention.

FIG. 1 is a schematic longitudinal cross-sectional view showing a strain wave gearing 1 with a built-in motor. The strain wave gearing 1 with a built-in motor is provided with a wave gear mechanism 2, and a motor 4 coaxially incorporated in the center portion of the wave gear mechanism 2. A spacing 6 for heat insulation is formed between the wave gear mechanism 2 and the motor 4.

The motor 4 incorporated in the center portion of the device is an outer rotor type motor, provided with a hollow motor stator 41, a motor rotor 42 concentrically enclosing the motor stator 41 across a fixed gap, and a motor bracket 43 to which the motor stator 41 is attached. The motor stator 41 is provided with a cylindrical stator core 44, and a stator coil 45 wound over a plurality of salient poles formed at fixed intervals in the circumferential direction along the external peripheral surface of the stator core.

The motor bracket 43 is provided with a disc-shaped bracket end plate portion 43a, and a bracket shaft portion 43b, which is circular in cross section and which protrudes in the direction of a center axis 1a from the center portion of the bracket end plate portion 43a. The bracket shaft portion 43b is coaxially inserted into the center portion of the stator core from an open end 44a on one side of the stator core 44. The distal end of the bracket shaft portion 43b extends to the proximity of an open end 44b on the other side of the stator core 44. An end plate 46 is attached to the open end 44b of the stator core 44. The stator core 44 is fixedly fastened to the motor bracket 43 by a fastening bolt 47 threaded into and fixed to the bracket shaft portion 43b through the end plate 46.

The motor rotor 42 is provided with a cylindrical rotor magnet 48, and a cylindrical rotor magnet back yoke 49 to which the rotor magnet 48 is attached. The inner-side rotor magnet 48 faces the inner-side stator core 44 across a fixed gap.

The motor stator 41 is molded from a high-thermal-conductivity resin 50. In FIG. 1, the molded portion is indicated as a hatched portion. The main cause of heat generation by the motor is copper loss in the stator coil when current is applied. The motor stator has a structure in which the coil is wound in many layers, with miniscule gaps in between the coil windings, inhibiting thermal conduction. Due the motor stator being molded from a high-thermal-conductivity resin, the miniscule gaps in between the coil windings are filled with the resin for molding, improving thermal conductivity.

Next, the wave gear mechanism 2 will be described. The wave gear mechanism 2 is configured from a flat strain wave gearing, and is provided with a rigid stationary-side internally toothed gear 21, a rigid drive-side internally toothed gear 22, a cylindrical and flexible externally toothed gear 23 disposed on the inner sides of the internally toothed gears, and a wave generator 24 disposed on the inner side of the externally toothed gear. The stationary-side internally toothed gear 21 is fixed to the motor bracket 43. The wave generator 24 causes the externally toothed gear 23 to flex into a non-circular shape and partially mesh with both the stationary-side internally toothed gear 21 and the drive-side internally toothed gear 22. The wave generator 24 is rotatably driven by the motor 4.

When the wave generator 24 rotates, the positions where the teeth mesh move in the circumferential direction. For example, the externally toothed gear 23 and the drive-side internally toothed gear 22 have the same number of teeth, while the number of teeth of the stationary-side internally toothed gear 21 is greater. When the wave generator 24 rotates, the externally toothed gear 23 and the drive-side internally toothed gear 22 rotate integrally because the stationary-side internally toothed gear 21 is fixed so as to not rotate, and reduced rotation according to the difference in the number of teeth can be acquired from the drive-side internally toothed gear 22.

In the present example, the externally toothed gear 23, made to flex into an ellipsoidal shape by the wave generator 24, meshes with the stationary-side internally toothed gear 21 and the drive-side internally toothed gear 22 in two locations. In this case, the difference in the number of teeth is 2n (n being a positive integer), and the difference in the number of teeth is typically two.

The stationary-side internally toothed gear 21 is fixed to an annular end surface of an outer peripheral portion 43c in the bracket end plate portion 43a. A cross roller bearing 25 is disposed between the stationary-side internally toothed gear 21 and the drive-side internally toothed gear 22, and the drive-side internally toothed gear 22 can rotate relative to the stationary-side internally toothed gear 21. The cross roller bearing 25 is provided with a divided-type outer race 25a fixedly fastened to the stationary-side internally toothed gear 21 by a fastening bolt 26, and an inner race 25b integrally formed in the drive-side internally toothed gear 22.

In the present example, the inner race 25b and an annular output shaft 27, from which reduced rotation is outputted, are integrally formed in the drive-side internally toothed gear 22. In other words, these three members are manufactured as a single component. A device housing is configured from the motor bracket 43, the outer peripheral portion of the stationary-side internally toothed gear 21, and the outer race 25a of the cross roller bearing 25.

The wave generator 24 is provided with a rigid wave generator plug 28 having a cylindrical shape, and a wave generator bearing 29 fitted on the external peripheral surface thereof. The wave generator plug 28 is coaxially fixed to a circular external peripheral surface 49a of the rotor magnet back yoke 49 so as to rotate integrally. An ellipsoidal external peripheral surface 28a of fixed width is formed in the external peripheral surface of the wave generator plug 28. The wave generator bearing 29 is fitted between the ellipsoidal external peripheral surface 28a and the internal peripheral surface of the externally toothed gear 23. A cylindrically shaped collar 31 is integrally formed in the wave generator plug 28. The collar 31 functions as an inner race restraint for the wave generator plug 28, and as a retainer restraint.

A bearing 32 is fitted between the external peripheral surface of the collar 31 and the internal peripheral surface of the output shaft 27. In the side that has the bracket end plate portion 43a, a bearing 33 is fitted between the bracket end plate portion 43a and the external peripheral surface of the rotor magnet back yoke 49 of the motor 4. The motor rotor 42 and the wave generator 24, which are linked so as to integrally rotate, are supported on both sides by the bearings 32, 33.

In this embodiment, a groove 28c of a predetermined depth, which extends in a spiral configuration at a fixed pitch along the direction of the center axis 1a, is formed in a circular internal peripheral surface 28b of the wave generator plug 28, which is in surface contact with the circular external peripheral surface 49a of the rotor magnet back yoke 49. Due to this groove 28c, the spacing 6 is formed between the rotor magnet back yoke 49 and the wave generator plug 28.

Because the spacing 6 is formed in the surface-contact portion between the motor 4 and the wave gear mechanism 2, motor heat generated in the motor 4 can be kept from being conducted to the side that has the wave gear mechanism 2. It is thereby possible to minimize adverse effects such as overheating in, inter alia, the sliding portion and teeth meshing portion in the side that has the wave gear mechanism 2 due to motor heat, and loss of longevity and efficiency.

It is also possible to provide a spacing having a shape other than a spiraling groove as the spacing 6. The spacing 6 is preferably provided so as to yield the desired heat-conduction blocking characteristic while maintaining the mechanical strength needed in both the rotor magnet back yoke 49 and the wave generator plug 28, and the joining strength therebetween.

Figure 2:
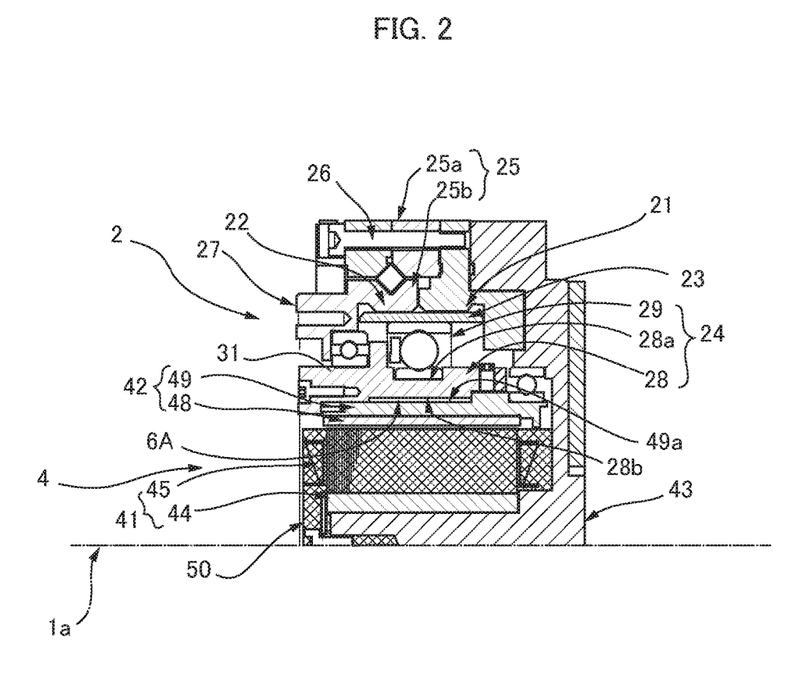
FIG. 2 is a schematic partial cross-sectional view showing an example of a strain wave gearing with a built-in motor having a spacing shaped differently from that of FIG. 1.

For example, a spacing 6A having the shape shown in FIG. 2 can be used. The cylindrical spacing 6A, which extends in the direction of the center axis 1a and has a fixed width and a fixed length, is provided between the circular external peripheral surface 49a of the rotor magnet back yoke 49 and the circular internal peripheral surface 28b of the wave generator plug 28, as shown in this drawing.

In the present example, because the motor stator 41 is molded from the high-thermal-conductivity resin 50, heat is conducted well and instances of motor heat being confined inside the stator are minimized. Furthermore, the bracket shaft portion 43b of the motor bracket 43 is inserted into the hollow part in the stator core 44 of the motor stator 41. Motor heat spreads from the stator core 44 to the bracket shaft portion 43b and from the bracket shaft portion 43b to the bracket end plate portion 43a, and from the outer-side surface thereof, the motor heat is released to the exterior. Because motor heat can be efficiently released to the exterior, overheating of the interiors of the motor 4 and the wave gear mechanism 2 can be prevented.

(Forced-Air-Cooling Mechanism)

Figure 3A:
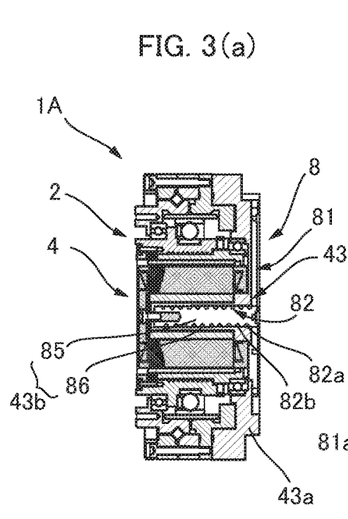
FIGS. 3(a) and 3(b) are respectively a schematic longitudinal cross-sectional view and an end surface view showing a strain wave gearing with a built-in motor provided with a cooling medium circuit.
Figure 3B:
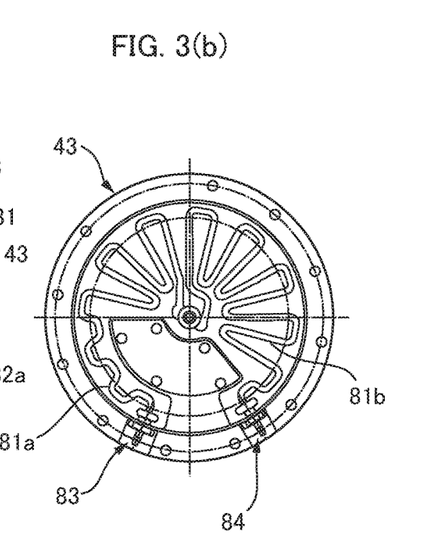

FIGS. 3(a) and (b) are a schematic longitudinal cross-sectional view and an end surface view showing a modification of the strain wave gearing 1 with a built-in motor. The strain wave gearing 1A with a built-in motor shown in these drawings is the strain wave gearing 1 with a built-in motor of FIG. 1 with a forced-air-cooling mechanism 8 added.

The forced-air-cooling mechanism 8 is provided with an end-face-side air circuit 81 formed along the outer surface of the bracket end plate portion 43a of the motor bracket 43, and a shaft-side air circuit 82 formed in the bracket shaft portion 43b. The end-face-side air circuit 81 is provided with an air inlet channel 81a joined to an air supply port 83, and an air discharge channel 81b joined to an air discharge port 84. The shaft-side air circuit 82 is provided with a spiraling airflow passage 82a communicating at one end with the air inlet channel 81a, and a spiraling airflow passage 82b joined at one end to the air discharge channel 81b. The two airflow passages 82a, 82b communicate with one another inside the distal-end side of the bracket shaft portion 43b.

The shaft-side air circuit 82 is obtained by, e.g., configuring the bracket shaft portion 43b from a cylindrical part 85 and a columnar portion 86 inserted through the hollow part thereof, and forming two spiraling grooves between the internal peripheral surface of the cylindrical part 85 and the external peripheral surface of the columnar portion 86.

Air for cooling is supplied from the exterior and circulated through the end-face-side air circuit 81 and the shaft-side air circuit 82, whereby the heat dissipation (heat venting) of the strain wave gearing 1A with a built-in motor can be improved. As shall be apparent, a fluid other than air; e.g., water or the like, may be used as the cooling medium.

Embodiment 2

The example described above is an example of a case in which a flat strain wave gearing is used in a wave gear mechanism to configure a strain wave gearing with a built-in motor. A strain wave gearing in the shape of a cup or a silk hat can be used as the strain wave gearing used in the wave gear mechanism.

Figure 4:
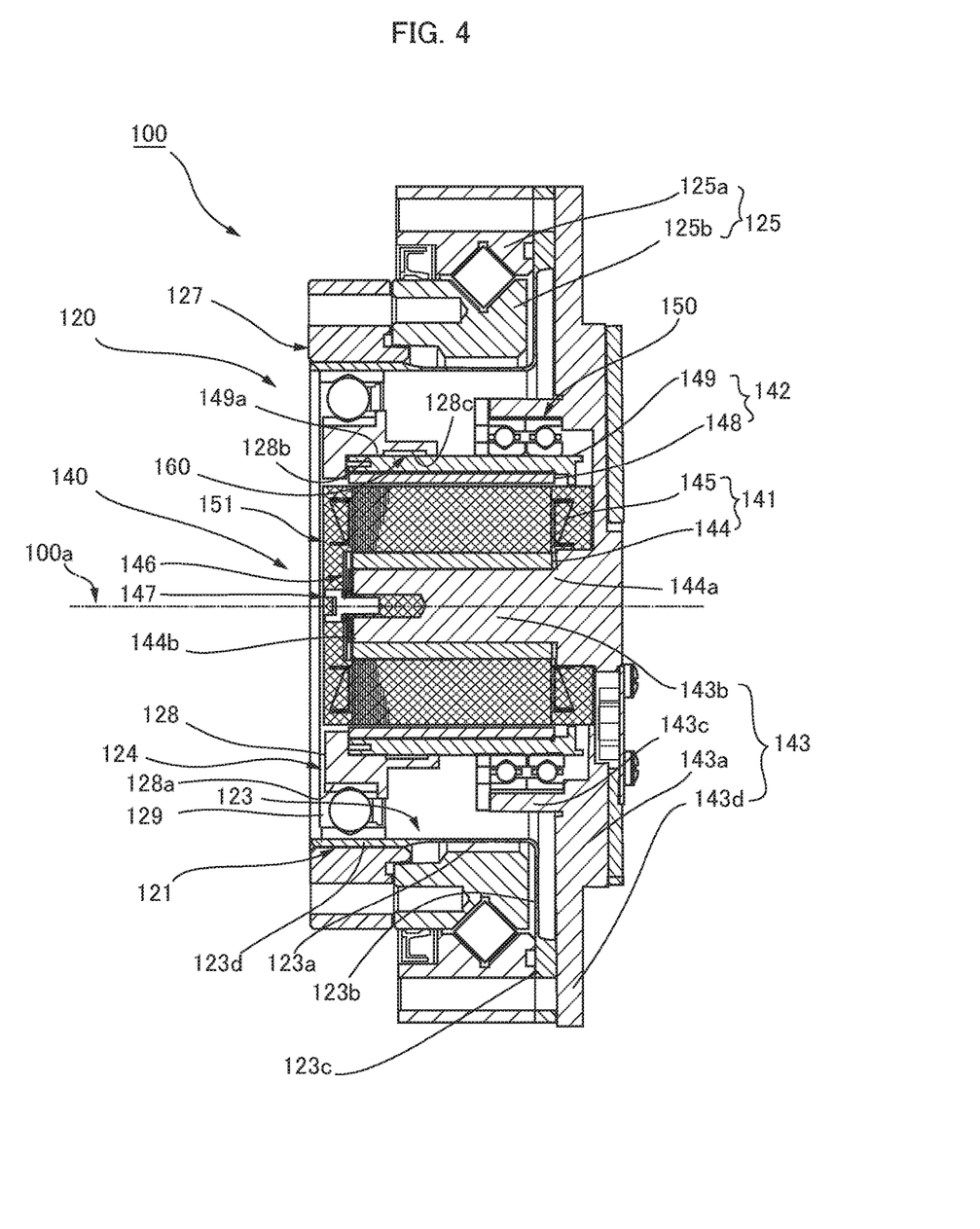
FIG. 4 is a schematic longitudinal cross-sectional view of a strain wave gearing with a built-in motor according to Embodiment 2 of the present invention.

FIG. 4 is a schematic longitudinal cross-sectional view showing an example of a strain wave gearing with a built-in motor in which a silk-hat-type strain wave gearing is used as the wave gear mechanism. The strain wave gearing 100 with a built-in motor shown in the drawing is provided with a wave gear mechanism 120, and a built-in motor 140 coaxially incorporated into the center portion of the wave gear mechanism 120. A heat-insulating spacing 160 is formed between the wave gear mechanism 120 and the motor 140.

The built-in motor 140 is an outer rotor type motor, and is provided with a motor stator 141, a motor rotor 142 concentrically enclosing the motor stator 141 across a fixed gap, and a motor bracket 143 to which the motor stator 141 is attached.

The motor stator 141 is provided with a cylindrical stator core 144, and a stator coil 145 wound over a plurality of salient poles formed at fixed intervals in the circumferential direction along the external peripheral surface of the stator core. The motor stator 141 is molded from a high-thermal-conductivity resin 151. In FIG. 4, the molded portion is showed as a hatched portion. Due the motor stator 141 being molded from the high-thermal-conductivity resin 151, the miniscule gaps in between the coil windings are filled with the resin for molding, improving thermal conductivity.

The motor bracket 143 is provided with a disc-shaped bracket end plate portion 143a, and a bracket shaft portion 143b of circular cross section, which protrudes in the direction of a center axis 100a from the center portion of the bracket end plate portion 143a. The bracket shaft portion 143b is coaxially inserted into this center portion from an open end 144a on one side of the stator core 144. The distal end of the bracket shaft portion 143b extends to an open end 144b on the other side of the stator core 144. An end plate 146 is attached to the open end 144b of the stator core 144. The stator core 144 is fixedly fastened to the motor bracket 143 by a fastening bolt 147 threaded into and fixed to the bracket shaft portion 143b through the end plate 146.

The motor rotor 142 is provided with a cylindrical rotor magnet 148, and a cylindrical rotor magnet back yoke 149 to which the rotor magnet 148 is attached. The inner-side rotor magnet 148 faces the inner-side stator core 144 across a fixed gap. A cylindrical bearing housing 143c is formed on the bracket end plate portion 143a of the motor bracket 143, and the motor rotor 142 is rotatably supported by a bearing 150 fitted in the bearing housing 143c.

Next, the wave gear mechanism 120 will be described. The wave gear mechanism 120 is a silk-hat-type strain wave gearing, provided with a rigid internally toothed gear 121, a flexible externally toothed gear 123 in the shape of a silk hat disposed on the inner side of the internally toothed gear, and a wave generator 124 disposed on the inner side of the externally toothed gear. The externally toothed gear 123 is fixed to the motor bracket 143 so as to not rotate, and the externally toothed gear 123, made to flex into a non-circular shape; e.g., an ellipsoidal shape, by the wave generator 124, partially meshes with the internally toothed gear 121. The wave generator 124 is rotatably driven by the motor 140.

When the wave generator 124 rotates, the positions where the teeth mesh move in the circumferential direction. For example, the number of teeth of the externally toothed gear 123 is less than the number of teeth of the internally toothed gear 121. Because the externally toothed gear 123 is fixed so as to not rotate, the internally toothed gear 121 rotates relatively in accordance with the difference in the number of teeth, and reduced rotation can therefore be acquired from the internally toothed gear.

The externally toothed gear 123 is provided with a cylindrical barrel part 123a, a diaphragm 123b widening radially outward from an open end on the side of the cylindrical barrel part 123a that is near the bracket end plate portion 143a of the motor bracket 143, a rigid annular boss 123c integrally formed on the external peripheral edge of the diaphragm 123b, and external teeth 123d formed in a portion of the external peripheral surface at the other open end of the cylindrical barrel part 123a.

The boss 123c of the externally toothed gear 123 is fixed to an annular end surface of an external peripheral side portion 143d in the bracket end plate portion 143a. A cross roller bearing 125 is disposed between the externally toothed gear 123 and the internally toothed gear 121, and the internally toothed gear 121 is able to rotate relative to the externally toothed gear 123. An outer race 125a of the cross roller bearing 125 clamps down on the boss 123c of the externally toothed gear 123, and this outer race is fixedly fastened by a fastening bolt to the side of the motor bracket 143. An inner race 125b of the cross roller bearing 125 is integrally formed on the external peripheral portion of the internally toothed gear 121. An annular output shaft 127 is coaxially and fixedly fastened to an annular end surface of the inner race 125b that faces toward the side opposite the bracket end plate portion 143a.

In the present example, a device housing is configured by the motor bracket 143, the boss 123c of the externally toothed gear 123, and the outer race 125a of the cross roller bearing 125.

The wave generator 124 is provided with a wave generator plug 128 that is overall annular and rigid, and a wave generator bearing 129 fitted over the external peripheral surface of this wave generator plug. The wave generator plug 128, which is coaxially and fixedly fastened to the output shaft 127-side of the rotor magnet back yoke 149, rotates integrally with the motor rotor 142. An ellipsoidal external peripheral surface 128a is formed in the external peripheral surface of the wave generator plug 128. The wave generator bearing 129 is fitted between the ellipsoidal external peripheral surface 128a and the internal peripheral surface of the externally toothed gear 123.

In this embodiment, a cylindrical groove 128c of a predetermined width, which extends along the direction of the center axis 100a, is formed in a circular internal peripheral surface 128b of the wave generator plug 128, which is in contact with a circular external peripheral surface 149a of the rotor magnet back yoke 149. Due to this groove 128c, the spacing 160 is formed between the rotor magnet back yoke 149 and the wave generator plug 128.

Because the spacing 160 is formed in the surface-contact portion between the motor 140 and the wave gear mechanism 120, motor heat generated in the motor 140 can be hindered from being conducted to the side that has the wave gear mechanism 120. It is thereby possible to avoid or minimize adverse effects such as overheating in, inter alia, the sliding portion and teeth meshing portion in the side that has the wave gear mechanism 120 due to motor heat, and loss of longevity and efficiency.

Various shapes other than that of the cylindrical groove 128c can be employed as the shape of the spacing 160. For example, it is possible to use a groove that extends in a spiral manner at a fixed pitch in the direction of the center axis 100a, as shown in FIG. 1. The spacing 160 is preferably provided so as to yield the desired heat-conduction blocking characteristic while maintaining the mechanical strength needed in both the rotor magnet back yoke 149 and the wave generator plug 128, and the joining strength therebetween.

In the present example, because the motor stator 141 is molded from the high-thermal-conductivity resin 151, heat is conducted well and instances of motor heat being confined inside the stator are minimized. Furthermore, the bracket shaft portion 143b of the motor bracket 143 is inserted into the hollow part in the stator core 144 of the motor stator 141.

Motor heat spreads from the stator core 144 to the bracket shaft portion 143b and from the bracket shaft portion 143b to the bracket end plate portion 143a, and from the outer-side surface thereof, the motor heat is released to the exterior. Therefore, motor heat can be efficiently released to the exterior, and overheating of the interiors of the motor 140 and the wave gear mechanism 120 can therefore be prevented.

As shall be apparent in the strain wave gearing 100 with a built-in motor of the present example, a cooling medium circuit such as is shown in FIG. 3 may be provided so as to enable heat to be released (discharged) to the exterior by air cooling or water cooling.

Embodiment 3

Next, in a strain wave gearing with a built-in motor; e.g., the strain wave gearing with a built-in motor of the embodiment described above, an encoder is installed for a high-precision-positioning application. Installing an encoder leads to an increase in the overall length of the device, and is also a factor contributing to reduced commercial viability. Therefore, it is preferable that an encoder can be installed without increasing the overall length of the device.

Figure 5:
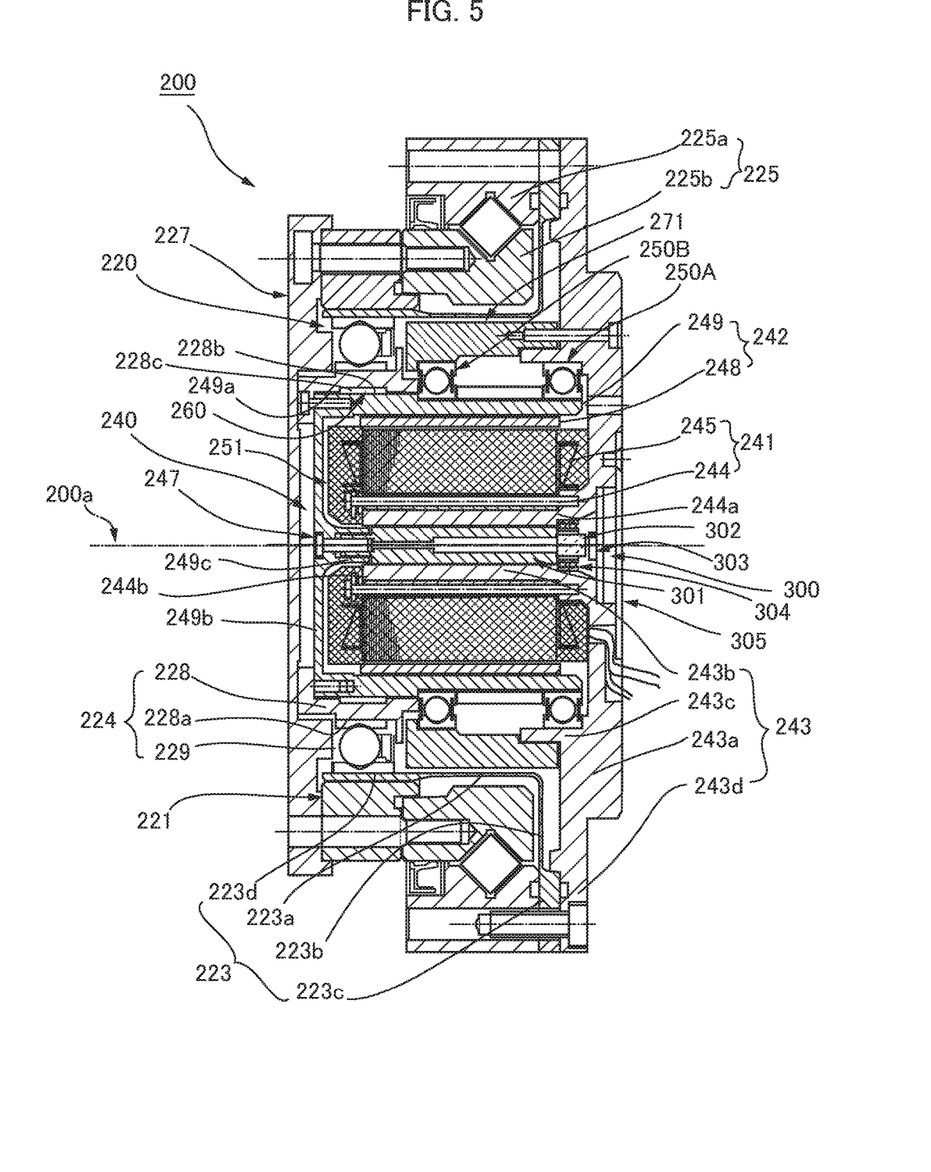
FIG. 5 is a schematic longitudinal cross-sectional view of a strain wave gearing with a built-in motor according to Embodiment 3 of the present invention.

FIG. 5 is a schematic longitudinal cross-sectional view showing a strain wave gearing with a built-in motor according to Embodiment 3. The strain wave gearing 200 with a built-in motor shown in the drawing has a structure in which an encoder is installed without increasing the overall length of the device.

The strain wave gearing 200 with a built-in motor is provided with a wave gear mechanism 220, and a motor 240 coaxially incorporated into the center portion of the wave gear mechanism 220. A spacing 260 for heat insulation is formed between the wave gear mechanism 220 and the motor 240. Additionally, an encoder 300 is incorporated into the center portion of the motor 240.

The built-in motor 240 is an outer rotor type motor, and is provided with a motor stator 241, a motor rotor 242 concentrically enclosing the motor stator 241 across a fixed gap, and a motor bracket 243 to which the motor stator 241 is attached.

The motor stator 241 is provided with a cylindrical stator core 244, and a stator coil 245 wound over a plurality of salient poles formed at fixed intervals in the circumferential direction along the external peripheral surface of the stator core. The motor stator 241 is molded from a high-thermal-conductivity resin 251. In FIG. 5, the molded portion is showed as a hatched portion. Due to the motor stator 241 being molded from the high-thermal-conductivity resin 251, the miniscule gaps in between the coil windings are filled with the resin for molding, improving thermal conductivity.

The motor bracket 243 is provided with a disc-shaped bracket end plate portion 243a, and a bracket hollow shaft portion 243b protruding in the direction of a center axis 200a at a right angle from the center portion of the bracket end plate portion 243a. The bracket hollow shaft portion 243b is coaxially inserted into this center portion from an open end 244a on one side of the stator core 244. The distal end of the bracket hollow shaft portion 243b extends to a position in proximity of ab open end 244b on the other side of the stator core 244. The stator core 244 is fixedly fastened to the motor bracket 243 by a fastening bolt 247.

The motor rotor 242 is provided with a cylindrical rotor magnet 248, and a cylindrical rotor magnet back yoke 249 to which the rotor magnet 248 is attached. The inner-side rotor magnet 248 faces the inner-side stator core 244 across a fixed gap. A cylindrical bearing housing 243c is formed on the bracket end plate portion 243a of the motor bracket 243, and a bearing 250A is fitted in this bearing housing 243c. A bearing housing 271 in the shape of a cylinder is fixedly fastened to the bracket end plate portion 243a, and a bearing 250B is fitted in this bearing housing 271. The motor rotor 242 is rotatably supported by this pair of bearings 250A, 250B.

In this embodiment, the encoder 300 is incorporated into the hollow part of the bracket hollow shaft portion 243b extending coaxially through the center portion of the motor stator 241. The encoder 300 of the present example is, e.g., a magnetic encoder, and is provided with: an encoder shaft 301; a magnetic pole plate 302, which is coaxially attached to the encoder shaft 301 and which is used for generating a rotating magnetic field; and a detector 303 equipped with a magnetic detection element for detecting the rotating magnetic field accompanying the rotation of the magnetic pole plate 302.

The encoder shaft 301 is fixed to the rotor magnet back yoke 249 so as to rotate integrally with the motor rotor 242. In the present example, a disc-shaped yoke end plate portion 249b is integrally formed in the end part of the rotor magnet back yoke 249 on the side near the open end 244b. A shaft part 249c, which protrudes into the hollow part of the bracket hollow shaft portion 243b, is formed in the center portion of the yoke end plate portion 249b.

The encoder shaft 301 is disposed coaxially in the hollow part of the bracket hollow shaft portion 243b, and one end of the encoder shaft is coaxially and fixedly fastened to the shaft part 249c. The other end part of the encoder shaft 301 is rotatably supported by a bearing 304 fitted inside the bracket hollow shaft portion 243b. The magnetic pole plate 302 is coaxially attached to the end part of the encoder shaft 301 that is supported by the bearing 304.

The detector 303 is disposed so that the magnetic detection element, from across a fixed gap, faces the magnetic pole surface formed on the end face of the magnetic pole plate 302. The detector 303 is attached to the bracket end plate portion 243a. The detector 303 is covered by an encoder cover 305 attached to the bracket end plate portion 243a.

In the motor 240 having an outer rotor structure, the motor stator 241, which is a fixed part, is positioned in the center portion. In the present example, a hollow part is formed in the center portion of the motor stator 241, and the encoder 300 is incorporated into this hollow part. Additionally, one part of the motor rotor 242 positioned on the outer peripheral side is extended to the hollow part, and motor rotation is transmitted to the encoder 300. It is thereby possible in the present example to prevent the increase in the overall length of the device that would be caused by installing the encoder 300.

Next, the wave gear mechanism 220 will be described. The wave gear mechanism 220 is a silk-hat-type strain wave gearing, provided with a rigid internally toothed gear 221, a flexible externally toothed gear 223 in the shape of a silk hat disposed on the inner side of the internally toothed gear, and a wave generator 224 disposed on the inner side of the externally toothed gear. The externally toothed gear 223 is fixed to the motor bracket 243 so as to not rotate, and the externally toothed gear 223, made to flex into a non-circular shape, e.g., an ellipsoidal shape by the wave generator 224, partially meshes with the internally toothed gear 221. The wave generator 224 is rotatably driven by the motor 240.

When the wave generator 224 rotates, the positions where the teeth mesh move in the circumferential direction. For example, the number of teeth of the externally toothed gear 223 is less than the number of teeth of the internally toothed gear 221. Because the externally toothed gear 223 is fixed so as to not rotate, the internally toothed gear 221 rotates relatively in accordance with the difference in the number of teeth, and reduced rotation can therefore be acquired from the internally toothed gear.

The externally toothed gear 223 is provided with a cylindrical barrel part 223a, a diaphragm 223b widening radially outward from an open end on the side of the cylindrical barrel part 223a that is near the bracket end plate portion 243a of the motor bracket 243, a rigid annular boss 223c integrally formed on the external peripheral edge of the diaphragm 223b, and external teeth 223d formed in a portion of the external peripheral surface at the other open end of the cylindrical barrel part 223a.

The boss 223c of the externally toothed gear 223 is fixed to an annular end surface of an external peripheral side portion 243d in the bracket end plate portion 243a. A cross roller bearing 225 is disposed between the externally toothed gear 223 and the internally toothed gear 221, and the internally toothed gear 221 is able to rotate relative to the externally toothed gear 223. An outer race 225a of the cross roller bearing 225 clamps down on the boss 223c of the externally toothed gear 223, and this outer race is fixedly fastened by a fastening bolt to the side of the motor bracket 243. An inner race 225b of the cross roller bearing 225 is integrally formed on the external peripheral portion of the internally toothed gear 221. An annular output shaft 227 is coaxially and fixedly fastened to an annular end surface of the inner race 225b that faces toward the side opposite the bracket end plate portion 243a.

In the present example, a device housing is configured by the motor bracket 243, the boss 223c of the externally toothed gear 223, and the outer race 225a of the cross roller bearing 225.

The wave generator 224 is provided with a wave generator plug 228 that is overall annular and rigid, and a wave generator bearing 229 fitted over the external peripheral surface of this wave generator plug. The wave generator plug 228, which is coaxially and fixedly fastened to the output shaft 227-side of the rotor magnet back yoke 249, rotates integrally with the motor rotor 242. An ellipsoidal external peripheral surface 228a is formed in the external peripheral surface of the wave generator plug 228. The wave generator bearing 229 is fitted between the ellipsoidal external peripheral surface 228a and the internal peripheral surface of the externally toothed gear 223.

A cylindrical groove 228c of a predetermined width, which extends along the direction of the center axis 200a, is formed in a circular internal peripheral surface 228b of the wave generator plug 228, which is in contact with a circular external peripheral surface 249a of the rotor magnet back yoke 249. Due to this groove 228c, the spacing 260 is formed between the rotor magnet back yoke 249 and the wave generator plug 228.

Because the spacing 260 is formed in the surface-contact portion between the motor 240 and the wave gear mechanism 220, motor heat generated in the motor 240 can be kept from being conducted to the side that has the wave gear mechanism 220. It is thereby possible to avoid or minimize adverse effects such as overheating in, inter alia, the sliding portion and teeth meshing portion in the side that has the wave gear mechanism 220 due to motor heat, and loss of longevity and efficiency.

Various shapes other than that of the cylindrical groove 228c can be employed as the shape of the spacing 260. For example, it is possible to use a groove that extends in a spiral manner at a fixed pitch in the direction of the center axis 200a, as shown in FIG. 1. The spacing 260 is preferably provided so as to yield the desired heat-conduction blocking characteristic while maintaining the mechanical strength needed in both the rotor magnet back yoke 249 and the wave generator plug 228, and the joining strength therebetween.

In the present example, because the motor stator 241 is molded from the high-thermal-conductivity resin 251, heat is conducted well and instances of motor heat being confined inside the stator are minimized. Furthermore, the bracket hollow shaft portion 243b of the motor bracket 243 is inserted into the hollow part in the stator core 244 of the motor stator 241. Motor heat spreads from the stator core 244 to the bracket hollow shaft portion 243b and from the bracket hollow shaft portion 243b to the bracket end plate portion 243a, and from the outer-side surface thereof, the motor heat is released to the exterior. Therefore, motor heat can be efficiently released to the exterior, and overheating of the interiors of the motor 240 and the wave gear mechanism 220 can therefore be prevented.

As shall be apparent in the strain wave gearing 200 with a built-in motor of the present example, a cooling medium circuit such as is shown in FIG. 3 may be provided so as to enable heat to be released (discharged) to the exterior by air cooling or water cooling.

What is claimed is:

1. A strain wave gearing with a built-in motor, comprising:
   a wave gear mechanism;
   a motor coaxially incorporated in a center portion of the wave gear mechanism; and
   a heat-insulating spacing disposed between the wave gear mechanism and the motor;
   wherein the motor has a motor stator, and a motor rotor disposed so as to enclose the motor stator;
   the wave gear mechanism has a wave generator attached to the motor rotor so as to rotate integrally with the motor rotor;
   the wave generator is disposed so as to enclose the motor rotor; and
   the spacing is formed between the motor rotor and the wave generator.

2. The strain wave gearing with the built-in motor according to claim 1,
   wherein the motor rotor has a cylindrical motor rotor back yoke to which a motor magnet is attached;
   the wave generator has a cylindrical wave generator plug formed with an internal peripheral surface which is in surface contact with an external peripheral surface of the motor rotor back yoke, and a wave generator bearing fitted on a non-circular external peripheral surface of the wave generator plug; and
   the spacing is formed between the external peripheral surface of the wave generator plug and the internal peripheral surface of the motor rotor back yoke.

3. The strain wave gearing with the built-in motor according to claim 1,
   wherein the spacing is either one of a spacing that is continuous in an axial direction or in a circumferential direction, or a spacing that is formed to be non-continuous in the axial direction or in the circumferential direction.

4. The strain wave gearing with the built-in motor according to claim 1,
   wherein the motor has a motor bracket to which the motor stator is attached;

the motor stator has a hollow part; and the motor bracket has a bracket end plate portion exposed to an exterior, and a bracket shaft portion inserted into the hollow portion.

5. The strain wave gearing with the built-in motor according to claim 4, further comprising:

a cooling medium circuit that is formed in the bracket shaft portion.

6. The strain wave gearing with the built-in motor according to claim 4, wherein the bracket shaft portion is a hollow shaft portion, and further comprising:

an encoder incorporated in a hollow part of the hollow shaft portion.

7. The strain wave gearing with the built-in motor according to claim 1, wherein at least a stator coil of the motor stator is molded from a thermal-conductivity resin.

8. The strain wave gearing with the built-in motor according to claim 1, wherein the motor rotor has a cylindrical motor rotor back yoke, and a rotor magnet attached to the motor rotor back yoke;

the wave generator has a cylindrical wave generator plug that is formed with an internal peripheral surface in surface contact with an external peripheral surface of the motor rotor back yoke, and a wave generator bearing fitted on a non-circular external peripheral surface of the wave generator plug;

the spacing is formed between the external peripheral surface of the wave generator plug and the internal peripheral surface of the motor rotor back yoke; and the spacing is either one of a spacing that is continuous in an axial direction or in a circumferential direction, or a spacing that is formed to be non-continuous in the axial direction or in the circumferential direction;

the motor has a motor bracket to which the motor stator is attached;

the motor stator has a hollow part;

the motor bracket has a bracket end plate portion exposed an exterior, and a bracket shaft portion inserted into the hollow part;

a cooling medium circuit is formed in the bracket shaft portion; and at least a stator coil of the motor stator is molded from a thermal-conductivity resin.

* * * * *